US011719288B2

(12) United States Patent
Budacs

(10) Patent No.: US 11,719,288 B2
(45) Date of Patent: Aug. 8, 2023

(54) TORQUE TRANSMISSION ARRANGEMENT

(71) Applicant: Ningbo Geely Automobile Research & Development Co., Ltd., Ningbo (CN)

(72) Inventor: Henrique Budacs, Gothenburg (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 49 days.

(21) Appl. No.: 17/478,610

(22) Filed: Sep. 17, 2021

(65) Prior Publication Data

US 2022/0003277 A1 Jan. 6, 2022

Related U.S. Application Data

(63) Continuation of application No. PCT/CN2020/080663, filed on Mar. 23, 2020.

(30) Foreign Application Priority Data

Mar. 27, 2019 (EP) .................................... 19165408

(51) Int. Cl.
*F16D 13/68* (2006.01)
*B60K 17/02* (2006.01)
(Continued)

(52) U.S. Cl.
CPC ............ *F16D 13/683* (2013.01); *B60K 17/02* (2013.01); *B60K 17/08* (2013.01); *F16D 21/00* (2013.01);
(Continued)

(58) Field of Classification Search
CPC .... F16D 13/683; F16D 2021/06; F16D 13/52; F16D 25/082; F16D 25/10; F28F 2275/08; F16H 3/46
See application file for complete search history.

(56) References Cited

U.S. PATENT DOCUMENTS 9,562,573 B2 2/2017 Bowman
10,857,582 B2 * 12/2020 Yamagata .................. B21J 5/08
(Continued)

FOREIGN PATENT DOCUMENTS

CN 1846080 A 10/2006
CN 1875201 A 12/2006
(Continued)

OTHER PUBLICATIONS

Machine translation of DE-102009005739-A1, retrieved from www.espacenet.com (Year: 2022).*

(Continued)

*Primary Examiner* — Stacey A Fluhart
(74) *Attorney, Agent, or Firm* — Tucker Ellis LLP

(57) ABSTRACT

A torque transmission arrangement includes a cylindrical friction element carrier and a snap-ring, the friction element carrier carries a pressing plate and a reaction plate of an outer friction-based torque-transmission mechanism rotationally secured to an outer surface and a pressing plate and a reaction plate of an inner friction-based torque-transmission mechanism rotationally secured to an inner surface. The friction element carrier includes through-holes distributed around the circumference of the friction element carrier. The snap-ring includes radial projections distributed around the inner or outer circumference of the snap-ring and configured to extend through said through-holes when the snap-ring is mounted on the friction element carrier, such that the snap-ring protrudes in a radial direction beyond both the inner and outer surfaces of the friction element carrier for retaining the inner and outer reaction plates of the inner and outer friction-based torque-transmission mechanisms on the friction element carrier.

14 Claims, 11 Drawing Sheets

(51) Int. Cl.
 B60K 17/08 (2006.01)
 F16D 21/00 (2006.01)
 *F16D 13/52* (2006.01)
 *F16D 25/08* (2006.01)
 *F16D 25/10* (2006.01)
 *F16H 3/46* (2006.01)

(52) U.S. Cl.
 CPC ............ *F16D 13/52* (2013.01); *F16D 25/082* (2013.01); *F16D 25/10* (2013.01); *F16D 2250/0023* (2013.01); *F16D 2250/0084* (2013.01); *F16H 3/46* (2013.01)

(56) References Cited

U.S. PATENT DOCUMENTS

2006/0289269 A1* 12/2006 Tiesler ................ F16D 25/0638
 192/106 F
2014/0110215 A1 4/2014 Goleski

FOREIGN PATENT DOCUMENTS

| CN | 109416107 | A | | 3/2019 | |
|---|---|---|---|---|---|
| DE | 10333431 | A1 | | 2/2005 | |
| DE | 102009005739 | A1 | * | 8/2009 | ............ F16D 13/52 |
| DE | 102009005739 | A1 | | 8/2009 | |
| DE | 102009047165 | A1 | | 6/2011 | |
| DE | 102009060351 | A1 | * | 6/2011 | ........... F16D 13/683 |
| DE | 112015000224 | T5 | * | 8/2016 | ............... F16H 3/66 |
| FR | 3081948 | A1 | * | 12/2019 | ........... F16D 25/083 |
| JP | 2011043197 | A | | 3/2011 | |
| JP | 2016001033 | A | | 1/2016 | |
| JP | 2019190526 | A | * | 10/2019 | |

OTHER PUBLICATIONS

International Search Report from corresponding International Application No. PCT/CN2020/080663, dated Jun. 23, 2020, 2 pages.

* cited by examiner

TORQUE TRANSMISSION ARRANGEMENT

RELATED APPLICATION DATA

This application is a continuation of International Patent Application No. PCT/CN2020/080663, filed Mar. 23, 2020, which claims the benefit of European Patent Application No. 19165408.6, filed Mar. 27, 2019, the disclosures of which are incorporated herein by reference in their entireties.

TECHNICAL FIELD

The disclosure relates to a torque transmission arrangement comprising a cylindrical friction element carrier and a snap-ring, wherein the friction element carrier is configured for carrying an outer friction-based torque-transmission mechanism rotationally secured to an outer surface of the friction element carrier and an inner friction-based torque-transmission mechanism rotationally secured to an inner surface of the friction element carrier. The disclosure also relates to a method for manufacturing such a torque transmission arrangement. The method and system according to the disclosure can for example be implemented in a transmission of a vehicle, such as a car.

However, although the disclosure primarily is described in relation to a front wheel driven car, the disclosure is not restricted to transmission arrangement for this particular type of vehicle, but may alternatively be implemented in transmission arrangements having other types of drivetrain layouts, such as rear wheel drive, all wheel drive, etc., and for other type of vehicles such as off-road vehicles, trucks, buses, marine vessels, working machines such as excavators, wheel loaders and the like, snowmobiles, motorcycles, etc.

BACKGROUND

Torque transmission arrangements often include some type of controllable friction-based torque-transmission mechanism, such as a friction clutch or friction brake for controlling the torque transmission from a torque input shaft to a torque output shaft of the torque transmission arrangement. It may for example be an open and closable clutch for enabling open or closed torque path, or it may be a brake for selectively setting a component of a planetary gear set in a rotational or non-rotational state.

A friction clutch or friction brake is often used for implementing a controllable clutch or brake arrangement. A friction clutch or friction brake typically includes a friction-based torque-transmission mechanism having at least one friction disc rotationally secured to a first part, a pressing plate and a reaction plate axially enclosing the at least one friction disc and being rotationally secured to a second part, and an actuator that is configured to selectively exerting an axial force on the pressing plate for axially compressing the friction disc between the pressing and reaction plates, and thereby selectively establishing a transfer torque between the first and second parts.

The reaction plate must then typically be axially secured to the second part for enabling the axial compression force to be developed by the actuator, and this may for example be accomplished using a snap-ring that is secured to the second part and that establishes an axial stop for the reaction plate.

It is also known from for example document US 2014/0110215 A1 to assembly two friction-based torque-transmission mechanisms on a common cylindrical carrier.

However, despite the activities in the field, there is still a demand for a further improved torque transmission arrangement, in particular with respect to compact, cost-efficient and lightweight design.

SUMMARY

This section provides a general summary of the disclosure, and is not a comprehensive disclosure of its full scope or all of its features.

An object of the present disclosure is consequently to provide an improved torque transmission arrangement, in particular with respect to compact, cost-efficient and lightweight design.

This and other objects are at least partly achieved by a torque transmission arrangements and method for manufacturing a torque transmission arrangement, as defined in the accompanying independent claims.

In particular, according to a first aspect of the present disclosure, the objective is at least partly achieved by a torque transmission arrangement comprising a cylindrical friction element carrier and a snap-ring, wherein the friction element carrier is configured for carrying at least a pressing plate and a reaction plate of an outer friction-based torque-transmission mechanism rotationally secured to an outer surface of the friction element carrier and at least a pressing plate and a reaction plate of an inner friction-based torque-transmission mechanism rotationally secured to an inner surface of the friction element carrier, wherein the cylindrical friction element carrier comprises a plurality of through-holes distributed around the circumference of the friction element carrier, and wherein the snap-ring comprises a plurality of radial projections distributed around the inner or outer circumference of the snap-ring and configured to extend through said through-holes when the snap-ring is mounted on the friction element carrier, such that the snap-ring when mounted on the friction element carrier protrudes in a radial direction beyond both the inner and outer surfaces of the friction element carrier for retaining the inner and outer reaction plates of the inner and outer friction-based torque-transmission mechanisms on the friction element carrier.

Moreover, according to a second aspect of the present disclosure, the objective is also at least partly achieved by a method for manufacturing a torque transmission arrangement comprising: providing a cylindrical friction element carrier having a plurality of through-holes distributed around a circumference of the friction element carrier, wherein the cylindrical friction element carrier is configured for carrying at least a pressing plate and a reaction plate of an outer friction-based torque-transmission mechanism rotationally secured to an outer surface of the friction element carrier and at least a pressing plate and a reaction plate of an inner friction-based torque-transmission mechanism rotationally secured to an inner surface of the friction element carrier, providing a snap-ring having a plurality of radial projections distributed around the inner or outer circumference of the snap-ring, and mounting the snap-ring on the friction element carrier, such that said radial projections extend through said through-holes, and such that the snap-ring protrudes in a radial direction beyond both the inner and outer surfaces of the friction element carrier for retaining the inner and outer reaction plates of the inner and outer friction-based torque-transmission mechanisms on the friction element carrier.

The underlying concept of the solution of the present disclosure is to provide a single snap-ring for axial blocking of the reaction plate of two individual friction-based torque-transmission mechanisms, namely the outer friction-based torque-transmission mechanism located on a radial outer side of the common cylindrical friction element carrier and the inner friction-based torque-transmission mechanism located on a radial inner side of the common cylindrical friction element carrier. Thereby, several advantages are accomplished.

For example, compared with a conventional solution that requires two snap-rings, one for each friction-based torque-transmission mechanism, a single snap-ring solution typically results a reduced cost, reduced overall weigh and simplified assembly. In particular, a single snap-ring may generally be assembled faster and more simple than two snap-rings, and a single snap-ring typically has lower weight than two snap-rings.

Moreover, the common cylindrical friction element carrier may also be manufactured in a significantly thinner material thickness because only a single circumferential channel is required in the cylindrical friction element carrier, compared with two circumferential channels, i.e. radially inner and outer, in a conventional solution. In other words, for having sufficient material strength still available in a region of common cylindrical friction element carrier having two circumferential channels, the material thickness must generally be more than twice the depth of each channel, while in a solution with a single channel, the material thickness must generally merely be more than the depth of a single channel.

Further advantages are achieved by implementing one or several of the features of the dependent claims.

In one example embodiment, the friction element carrier has a hollow cylindrical section with a meander-like cross section, so that outer axially extending toothing is formed on the outer peripheral side of the friction element carrier for engagement with inner toothing of at least the pressing plate and reaction plate of the outer friction-based torque-transmission mechanism, and so that inner axially extending toothing is formed on the inner peripheral side of the friction element carrier for engagement with outer toothing of at least the pressing plate and reaction plate of the inner friction-based torque-transmission mechanism. Thereby, the friction element carrier enables cost-efficient rotationally secured connection between the friction element carrier and the reaction plates, pressing plates, and any possible disc-shaped friction elements.

In a further example embodiment, the snap-ring is mounted on the outer side of the friction element carrier and the through-holes are located primarily in crest-portions of the outer toothing. Thereby, the elastic snap-ring merely needs to be temporarily elastically expanded prior to mounting of the snap-ring on the friction element carrier.

In another example embodiment, the snap-ring is mounted on the inner side of the friction element carrier and the through-holes are located primarily in crest-portions of the inner toothing. Thereby, centrifugal forces acting on the snap-ring upon rotation of the friction element carrier will merely strengthen and improve the mounting of the snap-ring on the friction element carrier.

In yet a further example embodiment, the friction element carrier has one through-hole in a crest-portion of each inner or outer tooth. This enables good distribution of forces transferred from the snap-ring to the friction element carrier upon axial compression by an actuator.

In another example embodiment, the through-holes are formed by a channel extending across the entire width of at least a crest portion of the outer or inner toothing, wherein the channel extends in a direction perpendicular to the axial direction. Thereby, through-holes are relatively large in a circumferential direction, and the snap-ring may thus be provided with relatively wide and robust projections.

In still another example embodiment, the surfaces forming a bottom of the channel jointly define a cylindrical section that is concentric with the friction element carrier. Thereby, also a portion of the body of the snap-ring may be embedded within the through-holes for providing increased axial contact surface between the snap-ring and friction element carrier.

In yet another example embodiment, the friction element carrier in angular sections between neighboring through-holes has full material thickness. This enables a robust and strong friction element carrier.

In another example embodiment, each through-hole extends continuously through and between crest-portions of two, three, four, or more, neighboring inner or outer teeth. Thereby, the projections of the snap-ring may have a significantly larger size, as seen in a circumferential direction, and thus be stronger and more robust.

In a further example embodiment, at least one, specifically two, and more specifically three, fully intact inner or outer teeth are provided between neighboring through-holes. This enables a robust and strong friction element carrier In still a further example embodiment, the snap-ring has open ends for enabling elastic deformation of the snap-ring upon mounting of the snap-ring on the friction element carrier. An open elastic snap-ring functioning as a locking ring for the reaction plate enables swift and easy mounting of the snap-ring on the friction element carrier.

In still another example embodiment, the torque transmission arrangement further comprises an outer hub member, an inner hub member, an outer actuating device, and an inner actuating device, wherein the outer friction-based torque-transmission mechanism includes at least one friction disc rotationally secured to the outer hub member and located axially between the pressing plate and reaction plate of the outer friction-based torque-transmission mechanism, wherein the inner friction-based torque-transmission mechanism includes at least one friction disc rotationally secured to the inner hub member and located axially between the pressing plate and reaction plate of the inner friction-based torque-transmission mechanism, wherein each of the inner and outer actuating devices are configured for selectively exerting an axial pressure on the inner and outer pressing plates, respectively, for selectively axially compressing the at least one friction disc against the inner and outer reaction plates for establishing a torque transmission path through the outer and inner friction-based torque-transmission mechanisms. This design enables cost-efficient and robust implementation of the torque transmission arrangement with individually controlled outer and inner actuating devices.

In still another example embodiment, the torque transmission arrangement is a clutch-brake arrangement comprising at least one planetary gear set located in a stationary transmission housing, wherein the friction element carrier is stationary and fastened to the housing, wherein the outer hub member is rotationally connected to a sun gear, planetary carrier, or ring gear of one planetary gear set, and wherein inner hub member is rotationally connected to a sun gear, planetary carrier, or ring gear of one planetary gear set. The torque transmission arrangement when implemented in a planetary gear transmission enables a compact and robust torque transmission.

In yet another example embodiment, the torque transmission arrangement is a dual clutch arrangement, wherein the friction element carrier is rotatably fastened to an input shaft, wherein the outer hub member is rotationally connected to an outer shaft of a concentric dual shaft arrangement, and wherein the inner hub member is rotationally connected to an inner shaft of said concentric dual shaft arrangement. The torque transmission arrangement when implemented in a dual-clutch arrangement enables a compact and robust torque transmission.

The disclosure also relates to a vehicle comprising a torque transmission arrangement as described above.

Moreover, the step of providing a cylindrical friction element carrier described above may comprise: producing a rectangular flat sheet metal work piece, cutting a plurality of through-holes distributed along a line extending adjacent and along an entire side edge of the flat sheet metal work piece, producing linearly extending toothing on both side of the work piece, such that work piece has a meander-like cross section, and bending the work piece around an axis that is parallel with the longitudinal extension of the toothing and mutually fasten the facing side edges, such that a cylindrical friction element carrier is provided.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

The various example embodiments of the disclosure, including its particular features and example advantages, will be readily understood from the following illustrative and non-limiting detailed description and the accompanying drawings, in which.

DETAILED DESCRIPTION

Figure 1:
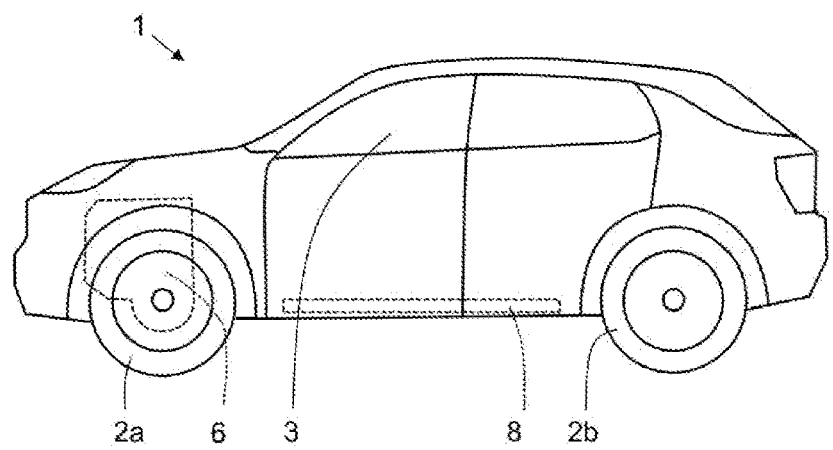
FIG. 1 shows a schematic side view of a vehicle including a torque transmission arrangement according to an example embodiment of the disclosure.

The present disclosure will now be described more fully hereinafter with reference to the accompanying drawings, in which exemplary embodiments of the disclosure are shown. The disclosure may, however, be embodied in many different forms and should not be construed as limited to the embodiments set forth herein; rather, these embodiments are provided for thoroughness and completeness. Like reference characters refer to like elements throughout the description. The drawings are not necessarily to scale and certain features may be exaggerated in order to better illustrate and explain the exemplary embodiments of the present disclosure.

Referring now to FIG. 1, there is depicted a side-view of an example embodiment of a vehicle 1, in particular a passenger car or automobile, having front wheels 2a, rear wheels 2b, and a passenger compartment 3. In the example embodiment showed in FIG. 1, the car has a hybrid electric powertrain 6 for front wheel drive, wherein the powertrain 6 comprises a combustion engine connected to a transmission with one or more integrated electrical propulsion motors. A high-voltage propulsion battery pack 8 for driving the electrical motor may for example be provided integrated into the floor of the car.

Figure 2:
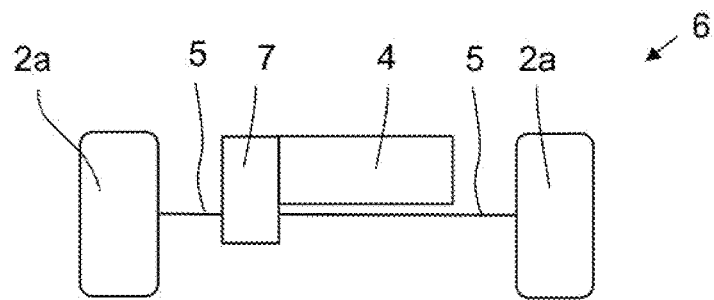
FIG. 2 shows a schematic top-view of an example embodiment of a drivetrain having a transmission including the torque transmission arrangement according to the present disclosure.

FIG. 2 schematically shows a top-view of the powertrain of FIG. 1 having the combustion engine 4 connected to the transmission 7, and drive shafts 5 for transferring rotational torque from a transmission 7 output shaft to the driving wheels 2a.

The powertrain 6 of the car schematically illustrated in FIGS. 1 and 2 merely illustrates one example embodiment of a powertrain transmission in which a torque transmission arrangement according to the present disclosure may be implemented. In other words, torque transmission arrangement according to the present disclosure may be implemented in many different types of transmissions for enabling a variable gear ratio between a transmission torque input shaft and torque output shaft. For example, the torque transmission arrangement according to the present disclosure may alternatively be implemented in transmissions for pure combustion driven vehicles or pure electric driven vehicles.

Figure 3:
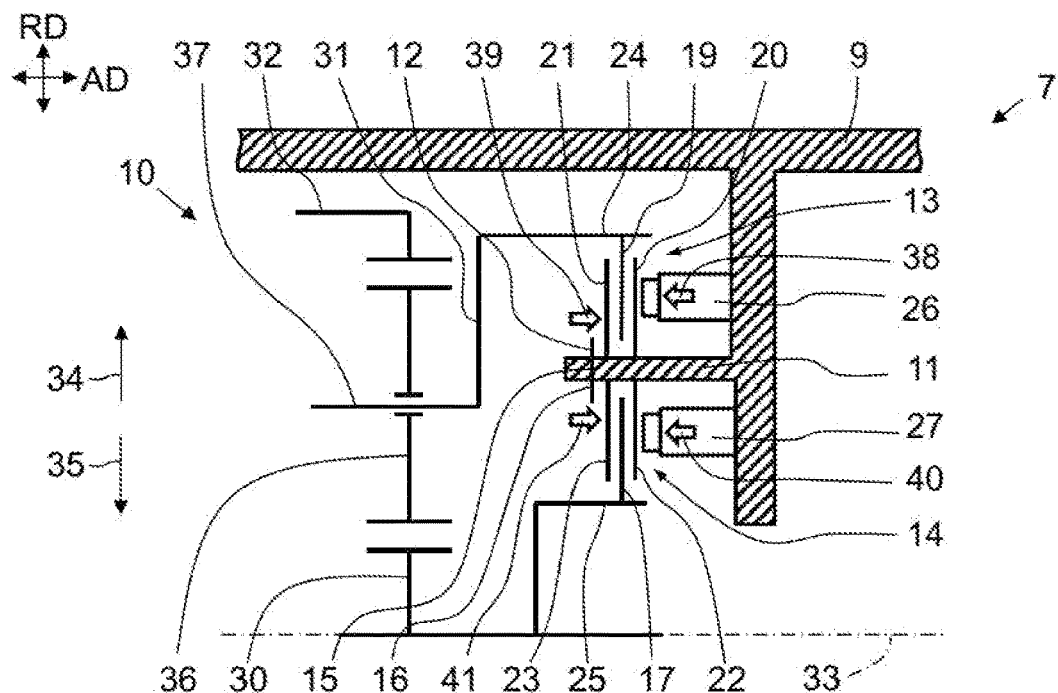
FIG. 3 shows a schematic cross-sectional view of torque transmission arrangement according to the present disclosure implemented in a planetary gear transmission.

FIG. 3 schematically shows a cross-sectional view of an example embodiment torque transmission arrangement arranged in a stationary transmission housing 9 of a transmission 7. The torque transmission arrangement comprising a cylindrical friction element carrier 11 and a snap-ring 12, wherein the friction element carrier 11 is configured for carrying at least a pressing plate 20 and a reaction plate 21 of an outer friction-based torque-transmission mechanism 13 rotationally secured to an outer surface of the friction element carrier 11 and at least a pressing plate 22 and a reaction plate 23 of an inner friction-based torque-transmission mechanism 14 rotationally secured to an inner surface of the friction element carrier 11, wherein the cylindrical friction element carrier 11 comprises a plurality of through-holes 15 distributed around the circumference of the friction element carrier 11, and wherein the snap-ring 12 comprises a plurality of radial projections 16 distributed around the inner or outer circumference of the snap-ring 12 and configured to extend through said through-holes 15 when the snap-ring 12 is mounted on the friction element carrier 11, such that the snap-ring 12 when mounted on the friction element carrier 11 protrudes in a radial direction beyond both the inner and outer surfaces of the friction element carrier 11 for retaining the inner and outer reaction plates 23, 21 of the inner and outer friction-based torque-transmission mechanisms 14, 13 on the friction element carrier 11.

Specifically, the torque transmission arrangement of FIG. 3 further comprises an outer hub member 24, an inner hub member 25, an outer actuating device 26, and an inner actuating device 27, wherein the outer friction-based torque-transmission mechanism 13 includes at least one friction disc 19 rotationally secured to the outer hub member 24 and located axially between the pressing plate 20 and reaction plate 21 of the outer friction-based torque-transmission mechanism 13, wherein the inner friction-based torque-transmission mechanism 14 includes at least one friction disc 17 rotationally secured to the inner hub member 25 and located axially between the pressing plate 22 and reaction plate 23 of the inner friction-based torque-transmission mechanism 14, wherein each of the inner and outer actuating devices 27, 26 are configured for selectively exerting an axial pressure on the inner and outer pressing plates 22, 20, respectively, for selectively axially compressing the at least one friction disc 17, 19 against the inner and outer reaction plates 23, 21 for establishing a torque transmission path through the outer and inner friction-based torque-transmission mechanisms 13, 14.

The torque transmission arrangement according to the disclosure may be implemented in many different types of transmissions. For example, as schematically illustrated in FIG. 3, the torque transmission arrangement may in one example embodiment be implemented as a clutch-brake arrangement comprising at least one planetary gear set 10 located in the stationary transmission housing 9, a stationary cylindrical friction element carrier 11 fastened to, or integrally formed with, the housing 9, wherein the outer hub member 24 is rotationally connected to a planetary carrier 31 of the planetary gear set 10, and wherein inner hub member 25 is rotationally connected to a sun gear 30 of the planetary gear set 10.

Thereby, the inner and outer friction-based torque-transmission mechanisms 14, 13 may be used for selectively braking the rotational movement of the sun gear 30 and planetary carrier 31, respectively, for establishing different gear ratio between an input and output shaft of the transmission.

Specifically, by controlling the outer actuating device 26, which may be configured as a fluid-based piston-type actuator, or a threaded linear-type actuator, or the like, to exert a first axial pressing force 38 on the pressing plate 20 of the outer friction-based torque-transmission mechanism 13, the pressing plate 20 will compress the friction disc 19 of the outer friction-based torque-transmission mechanism 13 against a first axial counter force 39 caused by the snap-ring 12 being secured to the cylindrical friction element carrier 11 and transferred to the axially blocked reaction plate 21 of the outer friction-based torque-transmission mechanism 13, thereby generating a torque path between the stationary housing 9 and outer hub 24, which torque path will act as a braking torque on the outer hub 24.

Similarly, by controlling the inner actuating device 27, which also may be configured as a fluid-based piston-type actuator, or a threaded linear-type actuator, or the like, to exert a second axial pressing force 40 on the pressing plate 22 of the inner friction-based torque-transmission mechanism 14, the pressing plate 22 will compress the friction disc 17 of the inner friction-based torque-transmission mechanism 14 against a second axial counter force 41 caused by the snap-ring 12 being secured to the cylindrical friction element carrier 11 and transferred to the axially blocked reaction plate 23 of the inner friction-based torque-transmission mechanism 14, thereby generating a torque path between the stationary housing 9 and inner hub 25, which torque path will act as a braking torque on the inner hub 25.

The inner and outer actuating devices 27, 26 may of course be controlled separately and independent from each other.

Merely for clarifying, an outer toothing of the sun gear 30 in FIG. 3 is in continuous meshing engagement with an outer toothing of each of a set of planet gears 36, and the outer toothing of each of the set of planet gears 36 is also in continuous meshing engagement with an inner toothing of the ring gear 32. Moreover, the planetary carrier 31 comprises a set of axial shafts 37 distributed around a circumference of the planetary carrier 31, wherein a planet gear 36 is rotationally mounted on each of said axial shafts 37.

Clearly, the present disclosure is not limited to the specific example embodiment of FIG. 3, but any of the inner and outer hub members 25, 24 may in fact be rotationally connected to any sun gear 30, planetary carrier 31, or ring gear 32 of any planetary gear set of the torque transmission arrangement. In other words, the inner and outer hub members 25, 24 may be connected to different planetary gear sets.

The schematic cross-sectional view of FIG. 3 shows a one radial side of a portion of the transmission 7, wherein each of the sun gear 30, ring gear 32, planetary carrier 31, inner hub 25 and outer hub 24 are configured to rotate around a common main axis 33, which is extending in an axial direction AD and perpendicular to a radial direction RD. Consequently, reference sign 34 indicates a radial outer direction and reference sign 35 indicates a radial inner direction of the torque transmission arrangement.

Figure 4:
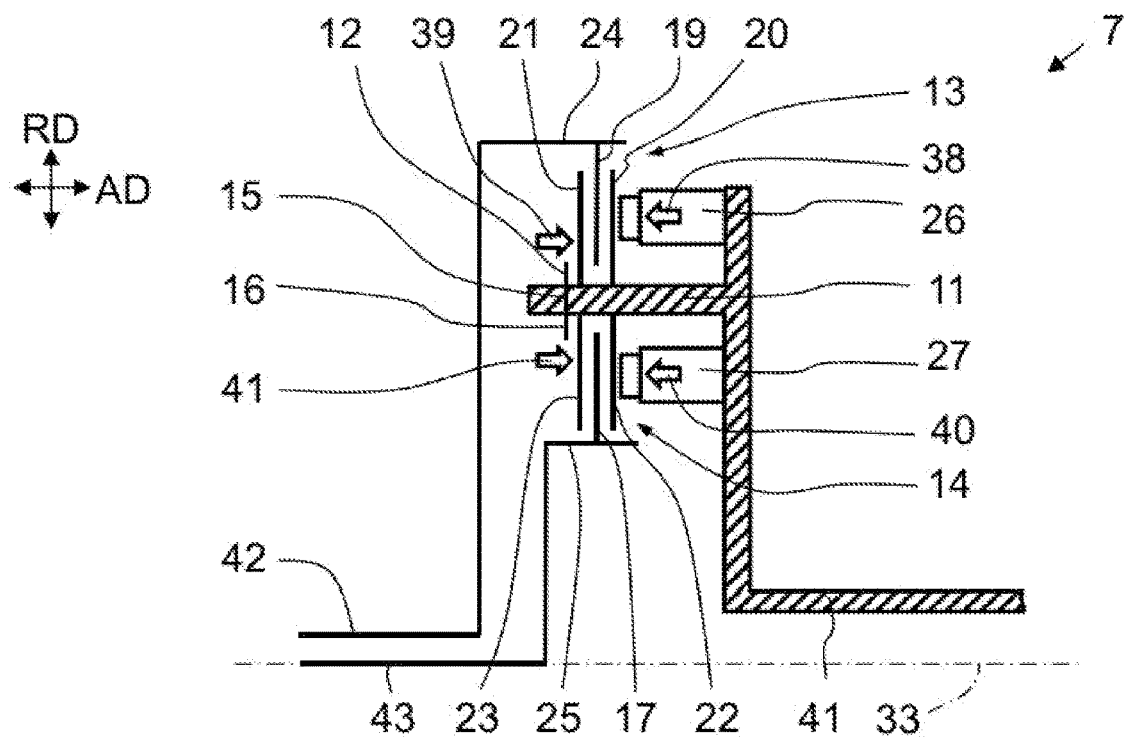
FIG. 4 shows a schematic cross-sectional view of torque transmission arrangement according to the present disclosure implemented in a dual clutch transmission.

As schematically shown in FIG. 4, the torque transmission arrangement according to the disclosure may alternatively be implemented in a dual clutch arrangement, wherein the torque transmission arrangement comprises an outer hub member 24, an inner hub member 25, an outer actuating device 26, and an inner actuating device 27, wherein the outer friction-based torque-transmission mechanism 13 includes at least one friction disc 19 rotationally secured to the outer hub member 24 and located axially between the pressing plate 20 and reaction plate 21 of the outer friction-based torque-transmission mechanism 13, wherein the inner friction-based torque-transmission mechanism 14 includes at least one friction disc 17 rotationally secured to the inner hub member 25 and located axially between the pressing plate 22 and reaction plate 23 of the inner friction-based torque-transmission mechanism 14, wherein each of the inner and outer actuating devices 27, 26 are configured for selectively exerting an axial pressure on the inner and outer pressing plates 22, 20, respectively, for selectively axially compressing the at least one friction disc 17, 19 against the inner and outer reaction plates 23, 21 for establishing a torque transmission path through the outer and inner friction-based torque-transmission mechanisms 13, 14.

Specifically, the cylindrical friction element carrier 11 is rotatably fastened to, or an integral part of, an input shaft 41 of the dual clutch arrangement, the outer hub member 24 is rotationally connected to an outer shaft 42 of a concentric dual shaft arrangement, and the inner hub member 25 is rotationally connected to an inner shaft 43 of said concentric dual shaft arrangement.

Figure 5:
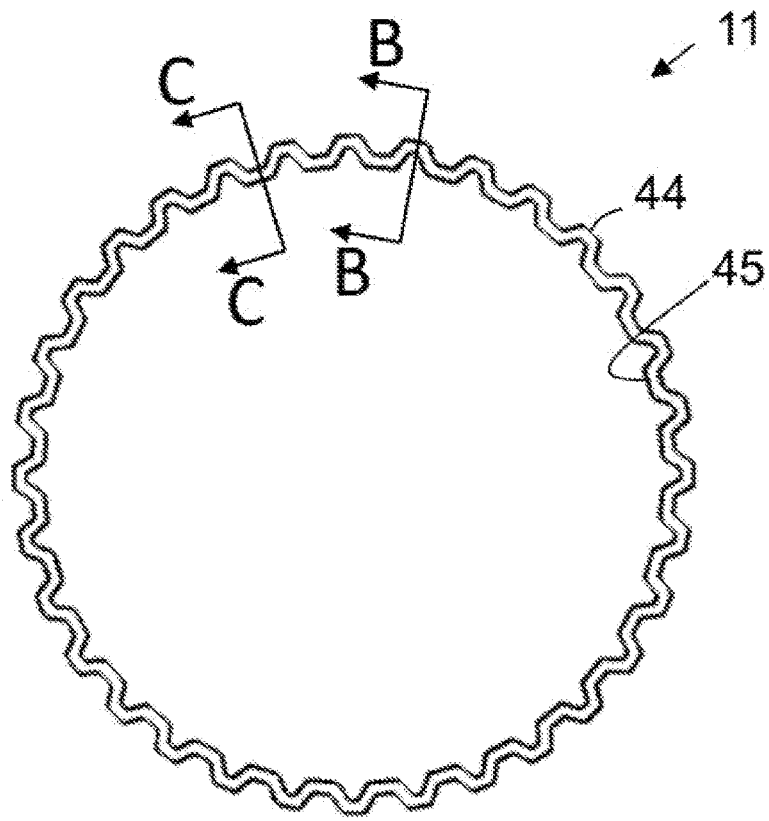
FIG. 5 shows a side view of the friction element carrier according to the disclosure.

FIG. 5 shows a side-view of the friction element carrier 11, as seen in the axial direction AD, in a region without through-holes 15. Moreover, FIG. 6 shows a schematic perspective view of the friction element carrier 11 attached, or integrally formed, with a member, such as a housing, a shaft, or the like, prior to making of the through-holes 15.

Figure 6:
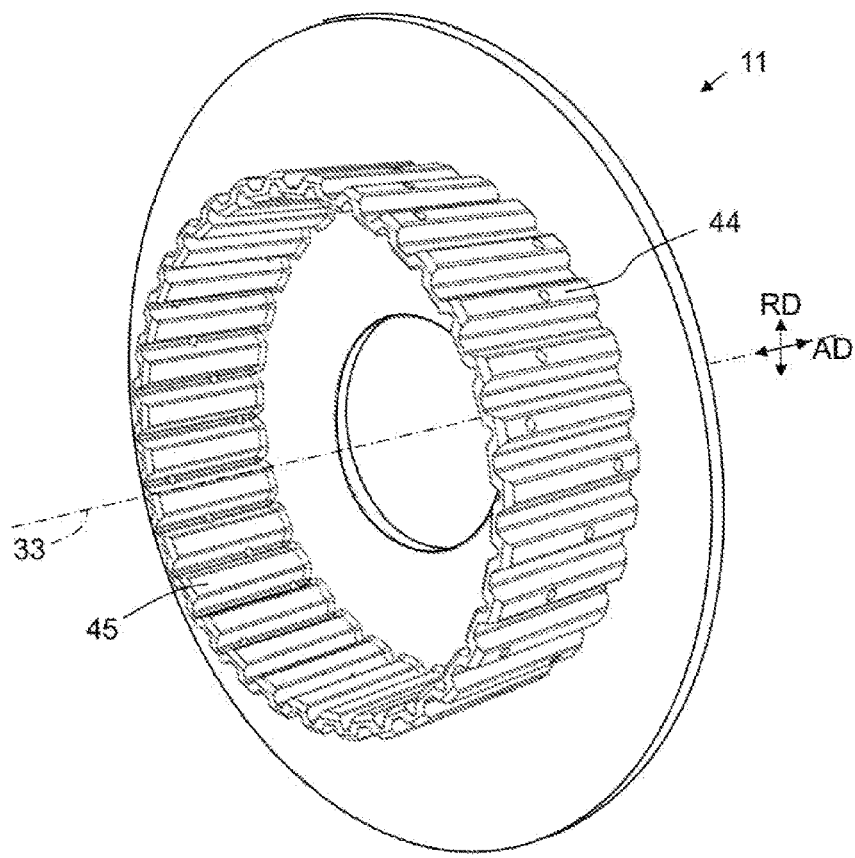
FIG. 6 shows a perspective view of the friction element carrier according to the disclosure.

As can be seen in FIGS. 5 and 6, the friction element carrier 11 may according to an example embodiment have a hollow cylindrical section with a meander-like cross section, so that outer axially extending toothing 44 is formed on the outer peripheral side of the friction element carrier 11 for engagement with inner toothing of the pressing plate 20 and reaction plate 21 of the outer friction-based torque-transmission mechanism 13, and so that inner axially extending toothing 45 is formed on the inner peripheral side of the friction element carrier 11 for engagement with outer toothing of the pressing plate 22 and reaction plate 23 of the inner friction-based torque-transmission mechanism 14.

Figure 7:
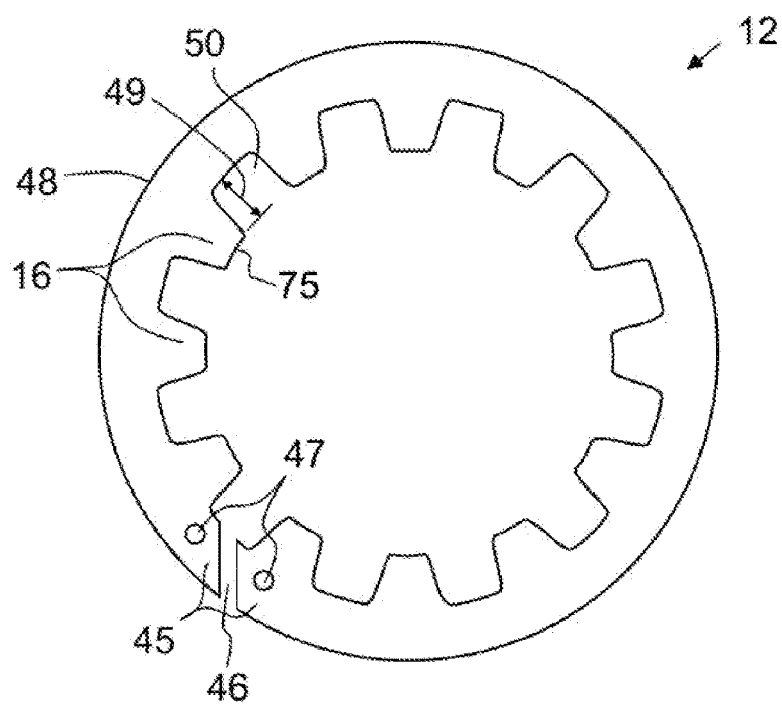
FIG. 7 shows a side view of the snap-ring.

The snap-ring is described more in detail with reference to FIG. 7, which shown a side-view of the snap-ring, as seen in the axial direction AD. The snap-ring may according to an example embodiment of the disclosure have open ends 45 for enabling elastic deformation of the snap-ring 12 upon mounting of the snap-ring on the friction element carrier 11. In other words, there may be an air-gap 46 between the open ends 45 of the snap-ring 12.

The snap-ring may thus be made in spring-steel or similar type of material that enables a large degree of elasticity. Holes 47 may for example be provided in the regions of the open ends 45 for simplifying handling of the snap-ring upon mounting of the snap-ring on the friction element carrier 11. Alternatively, radially protruding ears or the like may be used for handling.

The snap-ring 12 may comprise a plurality of radial projections 16 distributed around the inner circumference of the snap-ring 12 and configured to extend through through-holes 15 of the friction element carrier 11. An outer circumference 48 of the snap-ring 12 may in such a configuration be smooth.

A radial length 49 of the radial projections 16, as measured from a bottom of a recess 50, which is located between and defined by two neighboring projections 16, to a radial innermost end 75 of the projection 16, is selected such that a portion of a top region of the projections 16 extend beyond an inner surface of the friction element carrier 11, when the snap-ring 12 is properly mounted on the friction element carrier 11. Thereby, the snap-ring 12 may function as an axial blocking member for retaining the inner and outer reaction plates 23, 21 of the inner and outer friction-based torque-transmission mechanisms 14, 13 on the friction element carrier 11.

Figure 8A:
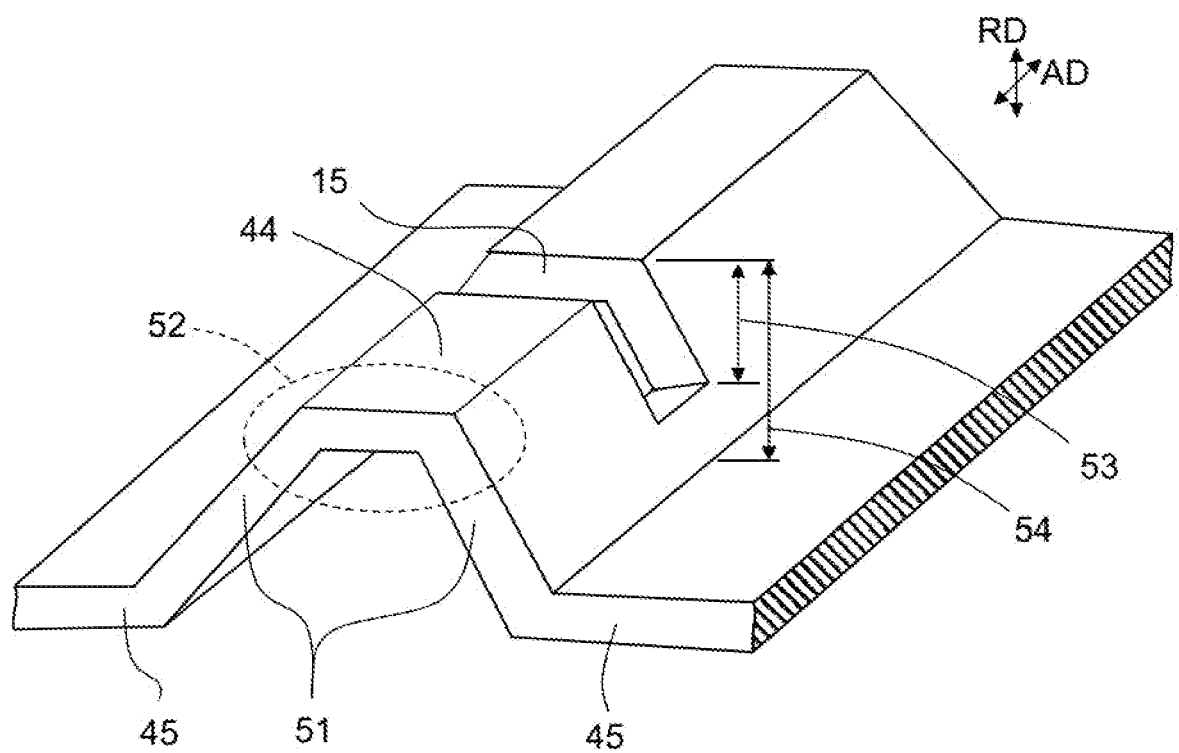
FIG. 8A-8B show a perspective view of a portion of the friction element carrier without and with a mounted snap-ring.

FIG. 8A schematically illustrates a portion of an example embodiment of a friction element carrier 11 having a through-hole 15 extending completely through the material thickness of the friction element carrier 11. In this specific embodiment, the through-hole 15 is located primarily in the outer axially extending toothing 44.

Figure 8B:
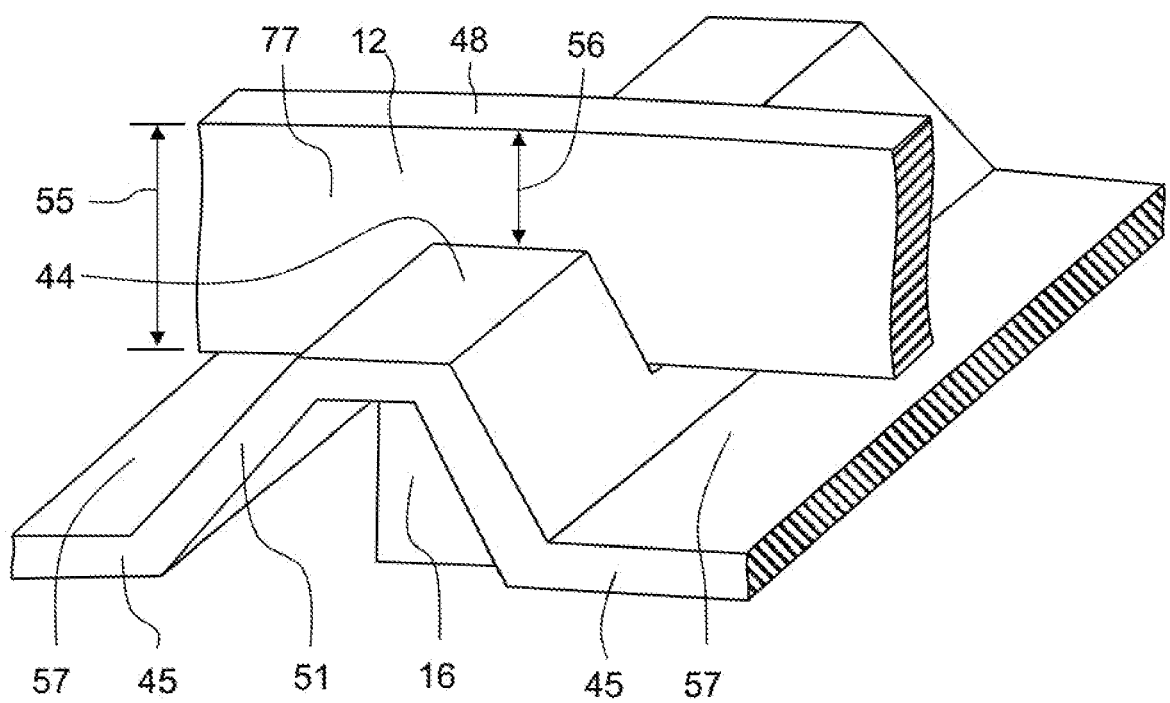

In FIG. 8A, the through-hole 15 also extends through the side walls 51 of the outer toothing, such that not only the projection 16 of the snap-ring 12, but also a portion of the body 77 of the snap-ring 12 may be lowered into the through-hole 15, which here corresponds to a channel extending across the entire width of a crest portion 52 of the outer toothing 44. FIG. 8B shows the same friction element carrier 11 but with a snap-ring 12 installed in the channel and the projection 16 extending radially inwards beyond an inner surface of the friction element carrier 11.

A minimal depth 53 of the channel in the radial direction RD may for example be in the range of 10-100%, specifically 20-80%, of a total depth 54 of the outer toothing 44, as measured from a radial outside of the outer toothing 44 to a radial outside of the neighboring inner toothing 45. A suitable minimal depth 53 of the channel typically depends on various factors, such as form, size and shape of the friction element carrier 11 and snap-ring 12.

Moreover, a radial height 55 of the body 77 of the snap-ring 12 is typically selected, taking into account said minimal depth 53 of the channel in the radial direction RD, such that the snap-ring 12 protrudes a distance 56 beyond the radially outer surface of the friction element carrier 11.

However, the radial distance 56 may alternatively be null, because the reaction plate 21 of the outer friction-based torque-transmission mechanism 13 will nevertheless interfere with the snap-ring in the recess regions 57 located between, and defined by, neighboring outer toothing 44, which recess regions 57 correspond to the inner axially extending toothing 45.

Figure 9A:
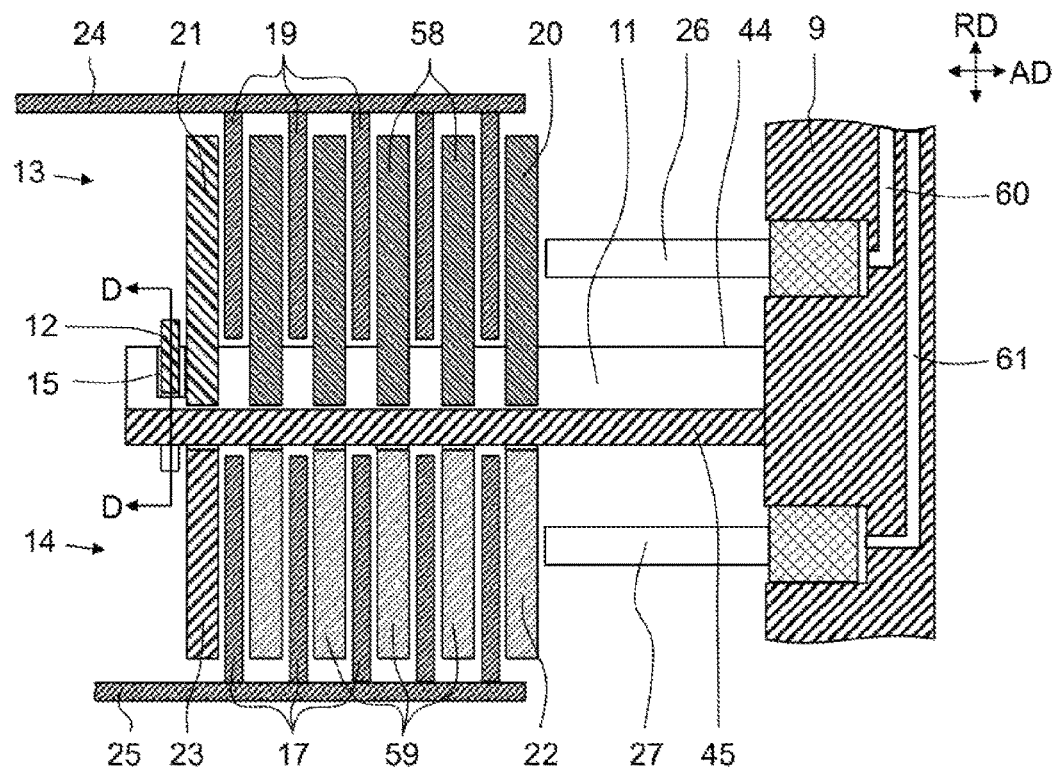
FIG. 9A-9D show a schematic cross-sectional view of a torque transmission arrangement according to the disclosure in various sections and states.
Figure 9B:
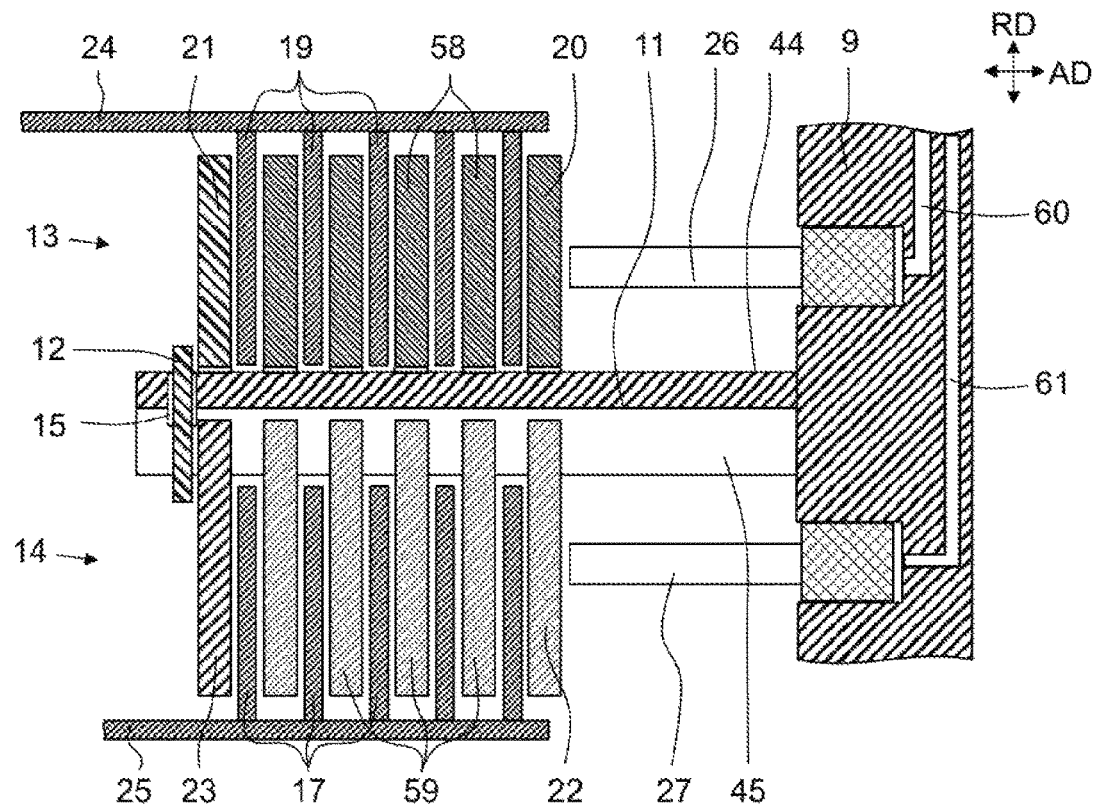
Figure 9C:
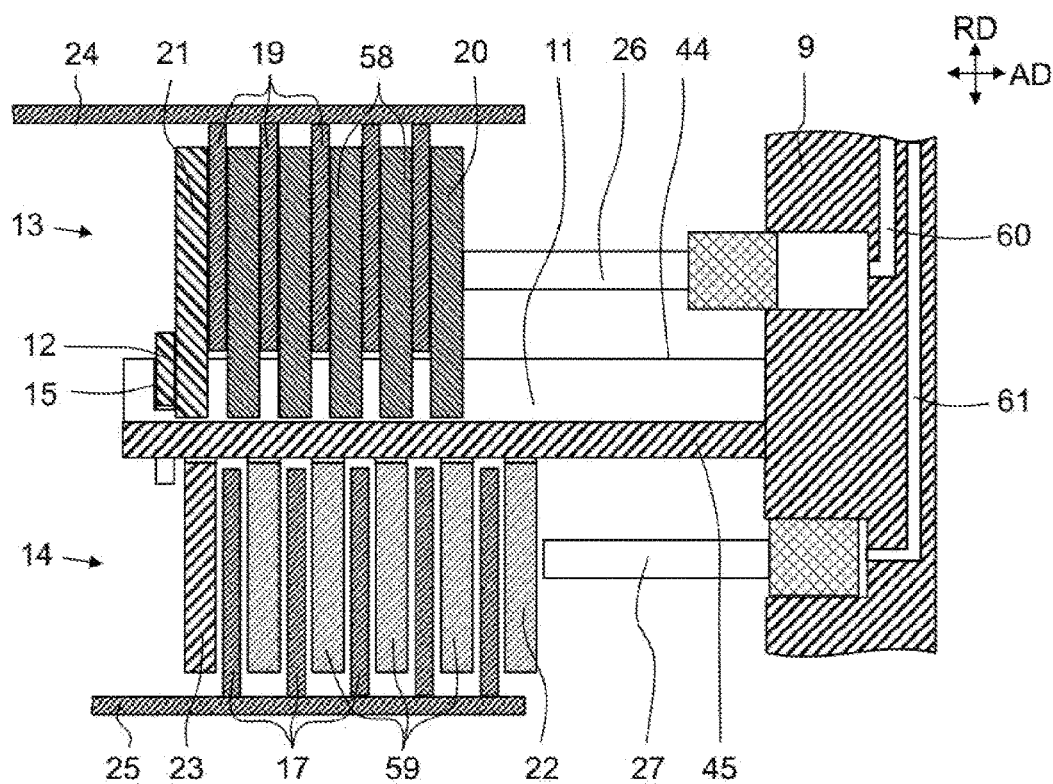
Figure 9D:
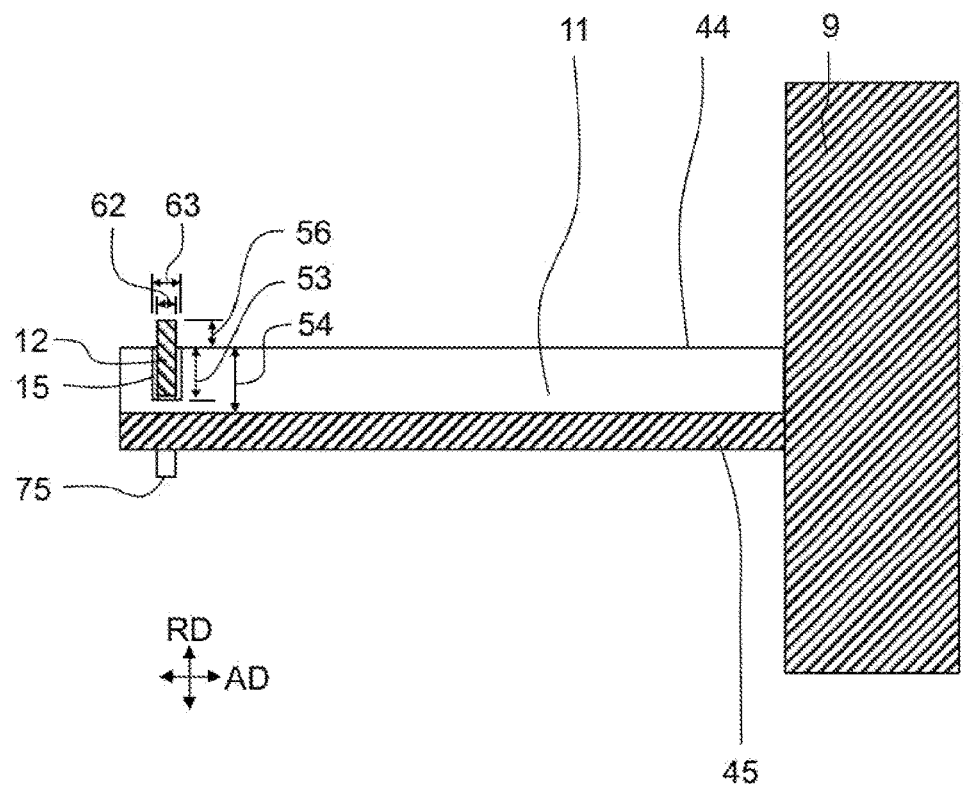

FIGS. 9A-9D show a cross-sectional view of a further example embodiment of the torque transmission arrangement according to the disclosure slightly more in detail. In particular, FIG. 9A shows a cross-section of the torque transmission arrangement extending through the inner axially extending toothing 45, as depicted by cut C-C in FIG. 5, and with both the inner and outer actuating devices 26, 27 in a non-actuated state. FIG. 9B shows a cross-section of the torque transmission arrangement extending through the outer axially extending toothing 44, as depicted by cut B-B in FIG. 5, and with both the inner and outer actuating devices 26, 27 in a non-actuated state. FIG. 9C shows the same cross-section as FIG. 9A but here with outer actuating device 26 in an actuated state and the inner actuating device 27 in a non-actuated state. Finally, FIG. 9D shows a cross-section of the friction element carrier 11 extending through the inner axially extending toothing 45 and with an assembled snap-ring 12, but without the inner and outer friction-based torque-transmission mechanism 14, 13 and inner and outer actuating devices 27, 26, for illustration purpose.

In the example embodiment of the torque transmission arrangement of FIGS. 9A-9D the outer friction-based torque-transmission mechanism 13 includes a plurality of friction discs 19 rotationally secured to the outer hub member 24, and a plurality of disc-shaped friction elements 58 interleaved with said friction discs 19, rotationally secured to the friction element carrier 11 and located between the reaction plate 21 and pressing plate 20.

Similarly, the inner friction-based torque-transmission mechanism 14 includes a plurality of friction discs 17 rotationally secured to the inner hub member 25, and a plurality of disc-shaped friction elements 59 interleaved with said friction discs 17, rotationally secured to the friction element carrier 11 and located between the reaction plate 23 and pressing plate 22.

In other words, depending on the level of torque transfer, more or less friction discs 17, 19 and disc-shaped friction elements 58, 59 may be added to the inner and outer friction-based torque-transmission mechanisms 14, 13, respectively.

Moreover, the pressing plates 20, 22 of the outer and inner friction-based torque-transmission mechanisms 13, 14 may be identical with the disc-shaped friction elements 58, 59, or they may have another design, for example being more rigid for better distributing the actuating force from the outer and inner actuating device 26, 27 on the friction discs 17, 19.

FIG. 9A clearly illustrates that the reaction plate 21, pressing plate 20, and the disc-shaped friction elements 58, of the outer friction-based torque-transmission mechanism 13 protrudes radially inwards into the recess regions 57 located next to the outer toothing 44, such that the outer axially extending toothing 44 engages with inner toothing of the reaction plate 21, pressing plate 20, and the disc-shaped friction elements 58 of the outer friction-based torque-transmission mechanism 13.

FIG. 9A further clearly shows that the snap-ring 12, when properly mounted in the plurality of through-holes 15 of the friction element carrier 11, functions as motion block against axial displacement of the reaction plates 21, 23 of both the outer and inner friction-based torque-transmission mechanism 13, 14 upon exertion of an actuating force by any of the outer and inner actuating device 26, 27.

The outer and inner actuating device 26, 27 are here illustrated as cylinder-piston-type actuators that are mounted in the housing 9 and connected to a fluid control valves (not showed) by an outer and inner fluid passage 60, 61, respectively.

FIG. 9B clearly illustrates that the reaction plate 23, pressing plate 22, and the disc-shaped friction elements 59, of the inner friction-based torque-transmission mechanism 14 protrudes radially outwards into the recess regions located next to the inner toothing 45, such that the inner axially extending toothing 45 engages with inner toothing of the reaction plate 23, pressing plate 22, and the disc-shaped friction elements 59 of the inner friction-based torque-transmission mechanism 14.

FIG. 9C illustrates a state in which the outer actuating device 26 is in an actuated state, such that the outer friction-based torque-transmission mechanism 13 is axially compressed against the reaction plate 21, which is axially supported by the snap-ring 12. In this state the torque transmission arrangement may transfer torque between the housing 9 and outer hub 24.

FIG. 9D shows merely the friction element carrier 11 with a mounted snap-ring 12. An axial width 63 of the channel forming the through-hole 15 may be for example about 0.5-2 mm larger than an axial width 62 of the snap-ring 12, for enabling a quick and simple mounting of the snap-ring, while avoiding large axial displacement of the snap-ring 12. The axial width 62 of the snap-ring 12 may for example be about 1-3 mm.

Figure 10A:
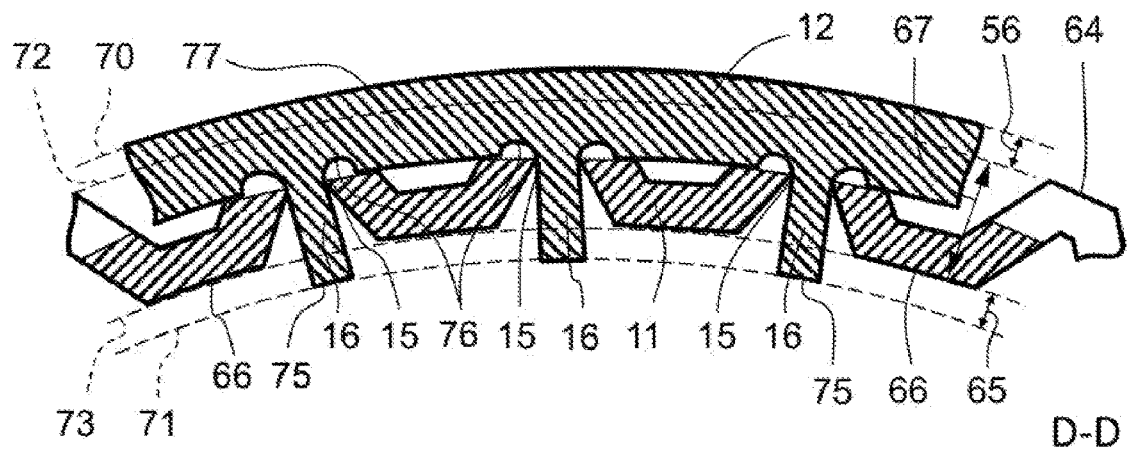
FIG. 10A-10B show a cross-sectional view of an example embodiment of a portion of the friction element carrier with and without a mounted snap-ring.
Figure 10B:
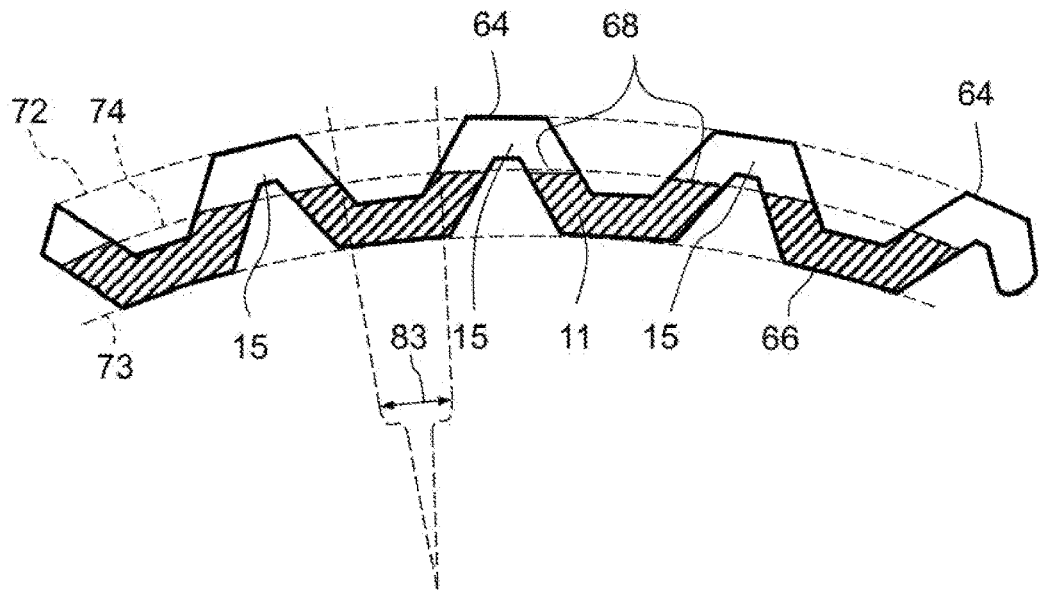

FIG. 10A shows a portion of a sectional view corresponding to cut D-D in FIG. 9A of an example embodiment of the snap-ring 12 and the friction element carrier 11, i.e. a sectional view through the friction element carrier 11 and snap-ring 12 in mounted state, and FIG. 10B shows the same sectional view without snap-ring 12.

FIGS. 10A and 10B clearly shows that the cylindrical friction element carrier 11 comprises a plurality of through-holes 15 distributed around the circumference of the friction element carrier 11, and that the snap-ring 12 comprises a plurality of radial projections 16 distributed around the inner circumference and configured to extend through said through-holes 15. In fact, the snap-ring 1 protrudes a radial distance 56 beyond the radially outermost surface 64 of the friction element carrier 11. Moreover, the snap-ring 1 also protrudes a radial distance 65 beyond the radially innermost surface 66 of the friction element carrier 11.

Said radial distances 56, 65 may for example be about 10-50% of the total radial cross-sectional dimension 67 of the side wall of the friction element carrier 11.

In the example embodiment of FIG. 10A-10B, the through-holes are formed by cutting a circumferential channel in the radially outer surface of the friction element carrier 11.

As a result, the surfaces 68 forming a bottom of the channel jointly define a cylindrical section that is concentric with the friction element carrier 11. Thereby, the snap-ring 12 may also be partly embedded within the friction element carrier 11, simply because also a portion of the body 77 of the snap-ring 12 can be inserted into the channel.

Cutting of a circumferential channel in the radially outer surface of the friction element carrier 11 for providing through-holes in the outer toothing 44 may for example be accomplished by rotating a cylindrical friction element carrier 11 while applying a cutting or grinding tool or the like to the outer surface of the friction element carrier 11.

Tension relief grooves or recess 76 may be provided in the transition area between the body 77 and radial projections 16 of the snap-ring 12 for improved stress distribution and avoiding stress concentration.

In FIGS. 10A and 10B, dotted arc-shaped line 70 extends along the outer circumference 48 of the snap-ring 12 and denotes thus a maximal radial extension of the snap-ring 12, dotted arc-shaped line 71 extends along the radially innermost ends 75 of the projections 16 of the snap-ring 12 and denotes thus a minimal radial extension of the snap-ring 12, dotted arc-shaped line 72 extends along the radially outermost surfaces 64 of the friction element carrier 11 and denotes thus a maximal radial extension of the friction element carrier 11, dotted arc-shaped line 73 extends along the radially innermost surfaces 66 of the friction element carrier 11 and denotes thus a minimal radial extension of the friction element carrier 11, and dotted arc-shaped line 74 extends along the surfaces 68 forming a bottom of the channel in the friction element carrier 11.

Figure 11:
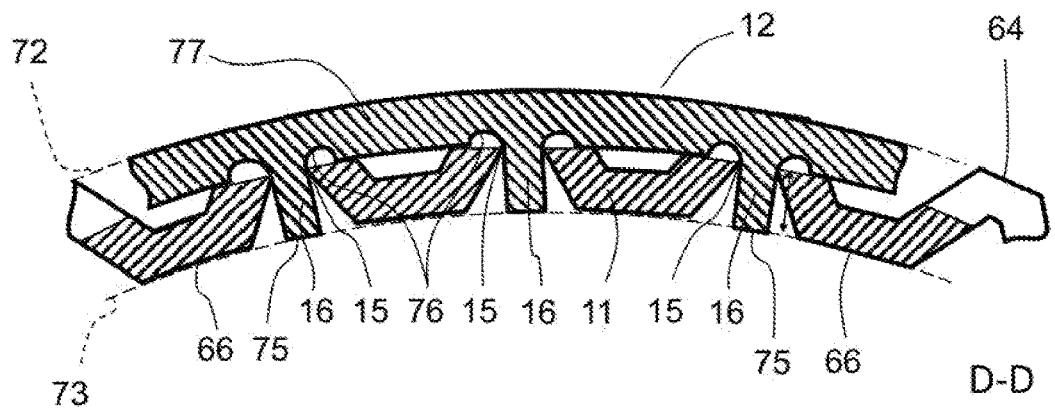
FIG. 11 shows a cross-sectional view of a further example embodiment of a portion of the friction element carrier with a mounted snap-ring.

FIG. 11 shows still a further example embodiment of the snap-ring 12 in a mounted stated on the friction element carrier 11. The friction element carrier 11 has the same form and design as the friction element carrier 11 described and showed with reference to FIGS. 10A and 10B. However, the embodiment of FIG. 11 differs in that the snap-ring 12 has smaller radial outward and inwards extension, such that the snap-ring 1 does not protrude beyond the radially outermost surface 64 of the friction element carrier 11. Moreover, the snap-ring 1 does also not protrude beyond the radially innermost surface 66 of the friction element carrier 11. Blocking of the reaction plate 21 of the outer friction-based torque-transmission mechanism 13 is here performed be interference between the snap-ring 12 and inner toothing of the reaction plate 21, which toothing is configured to also interact outer toothing 44 of the friction element carrier 11. Similarly, blocking of the reaction plate 23 of the inner friction-based torque-transmission mechanism 14 is here performed be interference between the snap-ring 12 and outer toothing of the reaction plate 21, which toothing is configured to also interact with inner toothing 45 of the friction element carrier 11. The design of the snap-ring 12 according to the disclosure of FIG. 11 provides a lower radial profile of the torque transmission arrangement, which lower radial profile may be desirable in certain configurations and layouts.

Figure 12A:
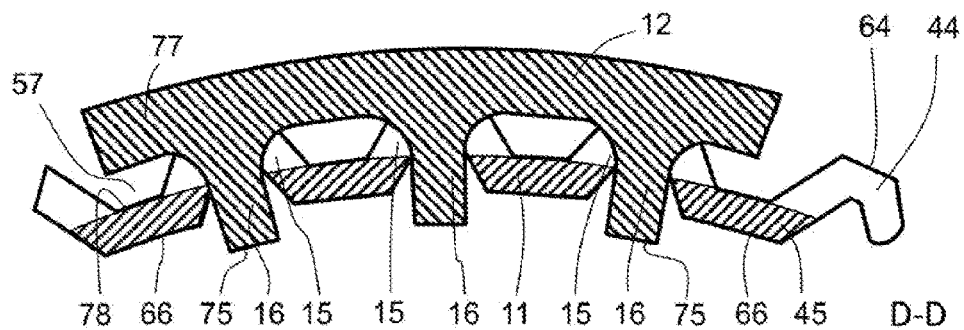
FIG. 12A-12B show a cross-sectional view of a further example embodiment of a portion of the friction element carrier with and without a mounted snap-ring.
Figure 12B:
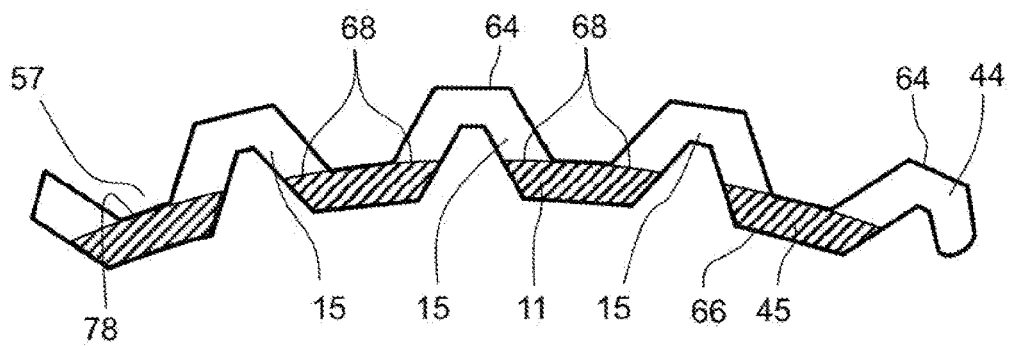

FIG. 12A shows still a further example embodiment of the snap-ring 12 in a mounted stated on the friction element carrier 11, and FIG. 12B shows the friction element carrier 11 without mounted snap-ring 12. In the example embodiment, the through-holes 15 is located in the outer toothing 44 and has the form of a circumferentially extending channel, similar to the embodiments of FIG. 10A-11, but here the channel is deeper and extends all the way down to a bottom surface 78 of the recess regions 57 located between neighboring outer toothing 44. As a result, the through-holes 15 may be larger for enabling large projections 16 of the snap-ring 12 to be inserted there-through.

Moreover, smoothly curved transition area between the body 77 and radial projections 16 of the snap-ring 12 may be provided for improved stress distribution and avoiding stress concentration.

Figure 13A:
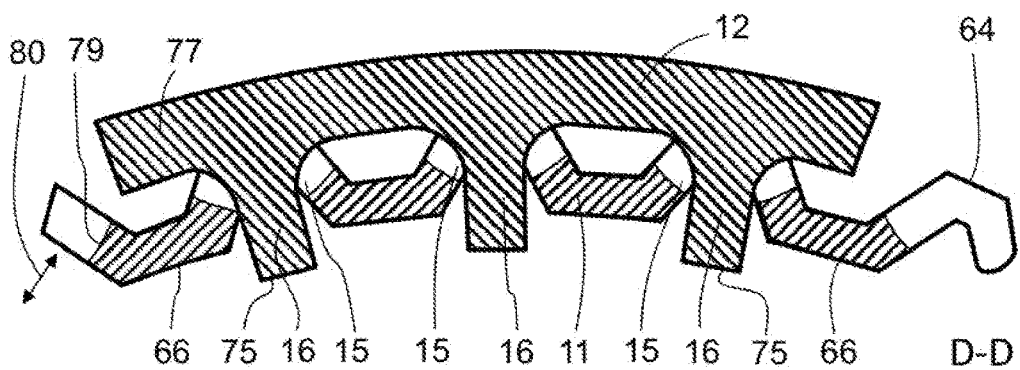
FIG. 13A-13B show a cross-sectional view of a further example embodiment of a portion of the friction element carrier with and without a mounted snap-ring.
Figure 13B:
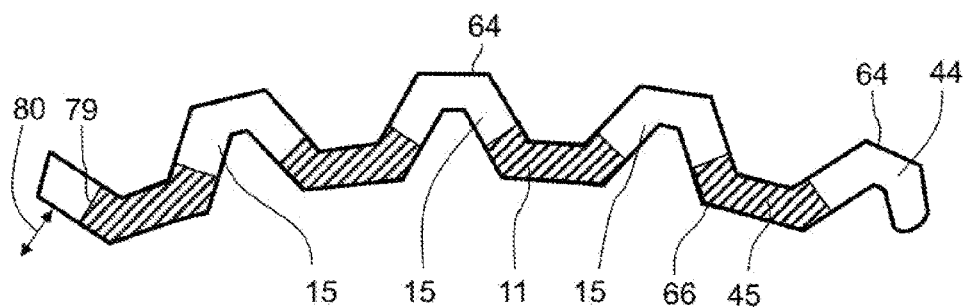

FIG. 13A shows still a further example embodiment of the snap-ring 12 in a mounted stated on the friction element carrier 11, and FIG. 13B shows the friction element carrier 11 without mounted snap-ring 12. In this example embodiment of the friction element carrier 11, a cut surface 79 of the through-holes 15 located in the outer toothing 44, as seen in the axial direction, are arranged substantially perpendicular to a direction of material thickness 80 of the friction element carrier 11, at a location of the cut surface 79. In other words, the cut surface 79 does lie in a plane defined by a cylindrical section that is concentric with the friction element carrier 11.

This type of cut surface of the through-holes 15 may for example be provided when the through-holes are first formed in a flat sheet material, for example by punching, laser cutting, water cutting or the like, and the flat sheet material subsequently is corrugated to form inner and outer toothing, and finally bent to a cylindrical form and welded along contacting edges.

Figure 14:
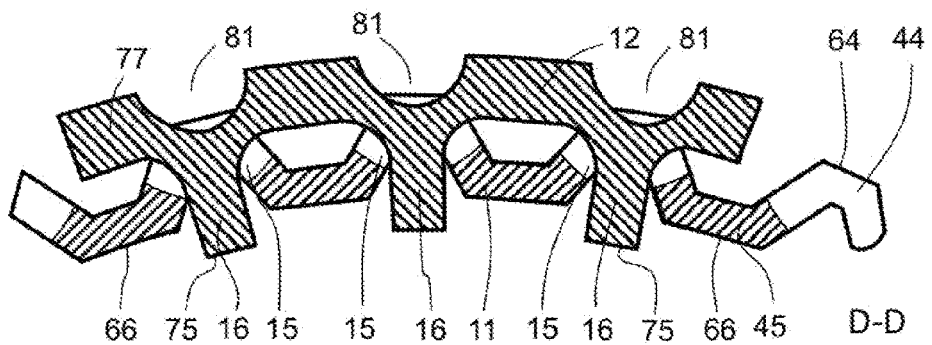
FIG. 14 shows a cross-sectional view of still a further example embodiment of a portion of the friction element carrier with a mounted snap-ring.

FIG. 14 shows still a further example embodiment of the snap-ring 12 in a mounted stated on the friction element carrier 11. The snap-ring 12 may have a plurality of cut-outs 81 in the body 77 and distributed around the circumference of the body 77 for increasing elasticity of the snap-ring 12, as well as for reducing weight. The cut-outs 81 may for example be located in a region of the body located opposite to the projections 16, as seen in a radial direction. Moreover, the cut-outs may overlap with the outer circumference of the snap-ring 12.

Figure 15:
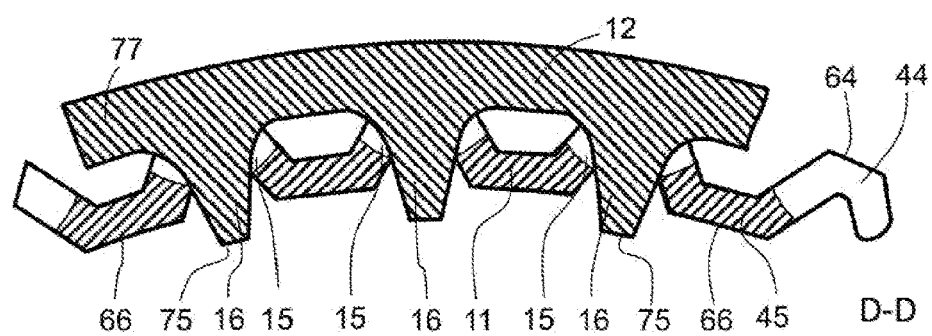
FIG. 15 shows a cross-sectional view of yet a further example embodiment of a portion of the friction element carrier with a mounted snap-ring.

FIG. 15 shows still a further example embodiment of the snap-ring 12 in a mounted stated on the friction element carrier 11. In this example embodiment, the projections 16 have a tapered form in the radial direction, such that the projections 16 have a generally smaller dimension at their free ends than at their base portions. This design enables a stronger and more robust snap-ring 12.

Figure 16:
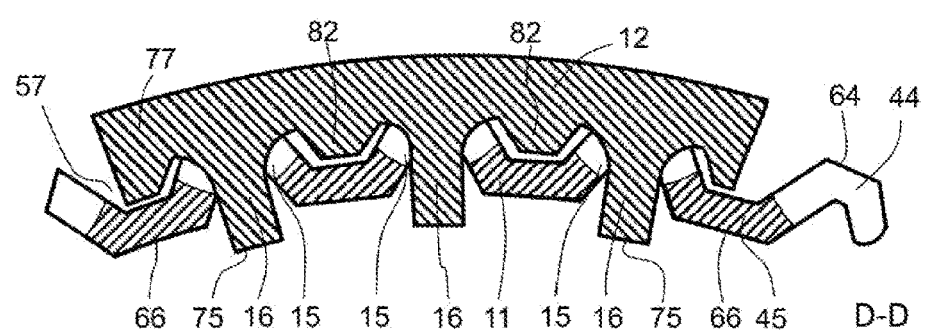
FIG. 16 shows a cross-sectional view of yet a further example embodiment of a portion of the friction element carrier with a mounted snap-ring.

FIG. 16 shows still a further example embodiment of the snap-ring 12 in a mounted stated on the friction element carrier 11. In this example embodiment, the body 77 of the snap-ring 12 is strengthened in intermediate areas located between neighboring projections 16. The strengthening of the body 77 may for example be performed by increasing the radial dimension of the snap-ring in said intermediate areas. In particular, radial projections 82 may be located in said intermediate areas and configured to project into recess regions 57 located between, and defined by, neighboring outer toothing 44.

In all example embodiment of FIGS. 10A-16, the friction element carrier 11 has one through-hole 15 in a crest-portion of each outer tooth 44. This enables a high distribution of forces from the clamp ring 2 to the friction element carrier 11 upon actuation of any of the inner and outer actuating devices 27, 26.

Figure 17:
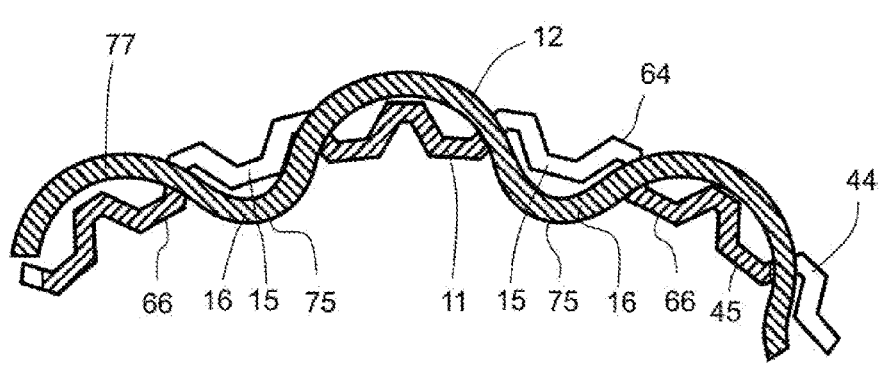
FIG. 17 shows a cross-sectional view of another example embodiment of a portion of the friction element carrier with a mounted snap-ring.

FIG. 17 shows still a further example embodiment of the snap-ring 12 in a mounted stated on the friction element carrier 11. In this example embodiment, the snap-ring 12 has a waveform along the circumference of the snap-ring, such that a radius of the snap-ring repeatedly gradually increases and decreases along the circumference. As a result, the general form of the snap-ring itself provides radial projections 16 located distributed around the circumference of the snap-ring 12. Moreover, said projections 16 are configured to be mounted in through-holes 15 of the friction element carrier 11.

In FIG. 17, each through-hole 15 extends continuously through and between crest-portions of two neighboring outer teeth 44. However, there may alternatively be one thoughhole 15 located in each tooth, or each through-hole 15 may alternatively extend continuously through and between crest-portions of three, four or more neighboring outer teeth 44. This applies to all described embodiments of the present disclosure.

Moreover, the friction element carrier 11 comprises one fully intact outer teeth 44 between neighboring throughholes 15. Thereby, the risk for fracture in the area of the snap-ring of the friction element carrier 11 due to high material stress levels is reduced. Alternatively, the friction element carrier 11 may comprise two, three, or more fully intact outer teeth 44 between neighboring through-holes. This applies to all described embodiments of the present disclosure.

Figure 18A:
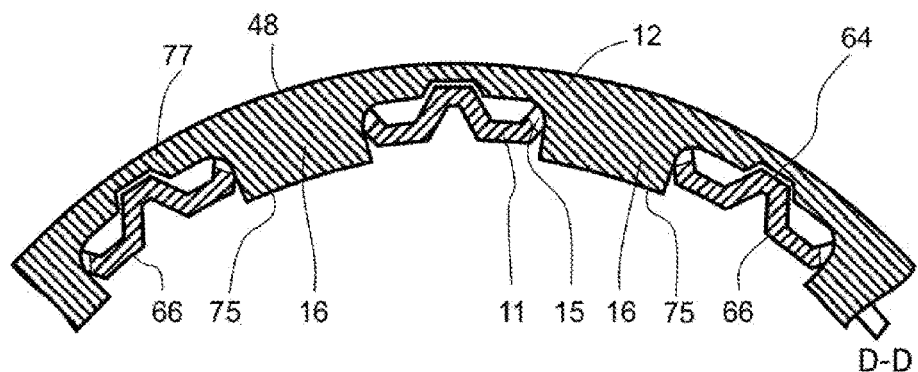
FIG. 18A-18B show a cross-sectional view of still another example embodiment of a portion of the friction element carrier with and without a mounted snap-ring.
Figure 18B:
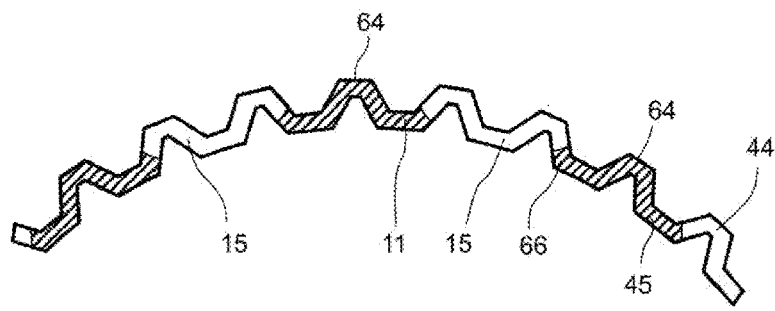

FIG. 18A shows still a further example embodiment of the snap-ring 12 in a mounted stated on the friction element carrier 11, and FIG. 18B shows the friction element carrier 11 without mounted snap-ring 12. Also in this embodiment of the friction element carrier 11 each through-hole 15 extends continuously through and between crest-portions of two neighboring outer teeth 44, and the friction element carrier 11 comprises one fully intact outer teeth 44 between neighboring through-holes 15. However, the snap-ring 12 a smooth and circular outer circumference 48 and the projections 16 has a rectangular-shape.

Moreover, in all example embodiment of FIGS. 10A-18B, the snap-ring is mounted on the outer side of the friction element carrier and the through-holes are located primarily in crest-portions of the outer toothing.

Figure 19A:
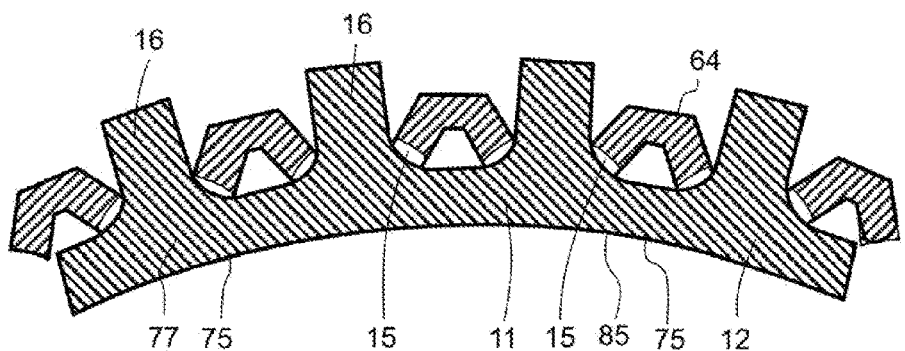
FIG. 19A-19B show a cross-sectional view of another example embodiment of a portion of the friction element carrier with and without a mounted snap-ring, and FIGS. 20 and 21 schematically illustrates a method for manufacturing a torque transmission arrangement according to the disclosure in different level of detail.
Figure 19B:
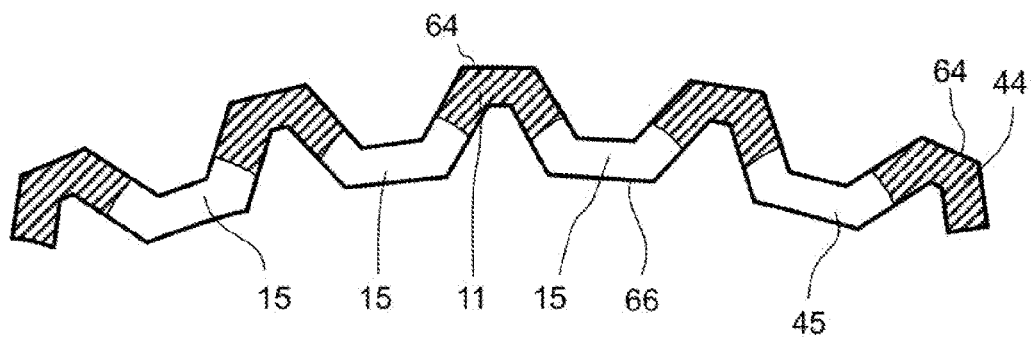

Finally, FIG. 19A shows still a further example embodiment of the snap-ring 12 in a mounted stated on the friction element carrier 11, and FIG. 19B shows the friction element carrier 11 without mounted snap-ring 12. In the example embodiment of FIG. 19A 19B, the snap-ring 12 is mounted on the inner side of the friction element carrier 11 and the through-holes are located primarily in crest-portions of the inner toothing 45. In other words, the snap-ring 12 a smooth and circular inner circumference 85 and the projections 16 has a rectangular-shape.

In the example embodiment illustrated in FIG. 19A-19B the friction element carrier has one through-hole 15 in a crest-portion of each inner tooth 45.

The air-gap 46 between the open ends 45 of the snap-ring 12 is preferably then slightly larger for enabling sufficient radial elastic crimping of the snap-ring during mounting of the snap-ring 12.

Moreover, in the example embodiment of FIGS. 10A-19, the friction element carrier 11 in angular sections 83 between neighboring through-holes 15 has full material thickness, as schematically illustrated in FIG. 10B. In other words, the friction element carrier 11 is intact and free from a groove configured for receiving the snap-ring 12 in certain angular sections 83 distributed around the circumference of the friction element carrier 11.

Figures 20, 21:
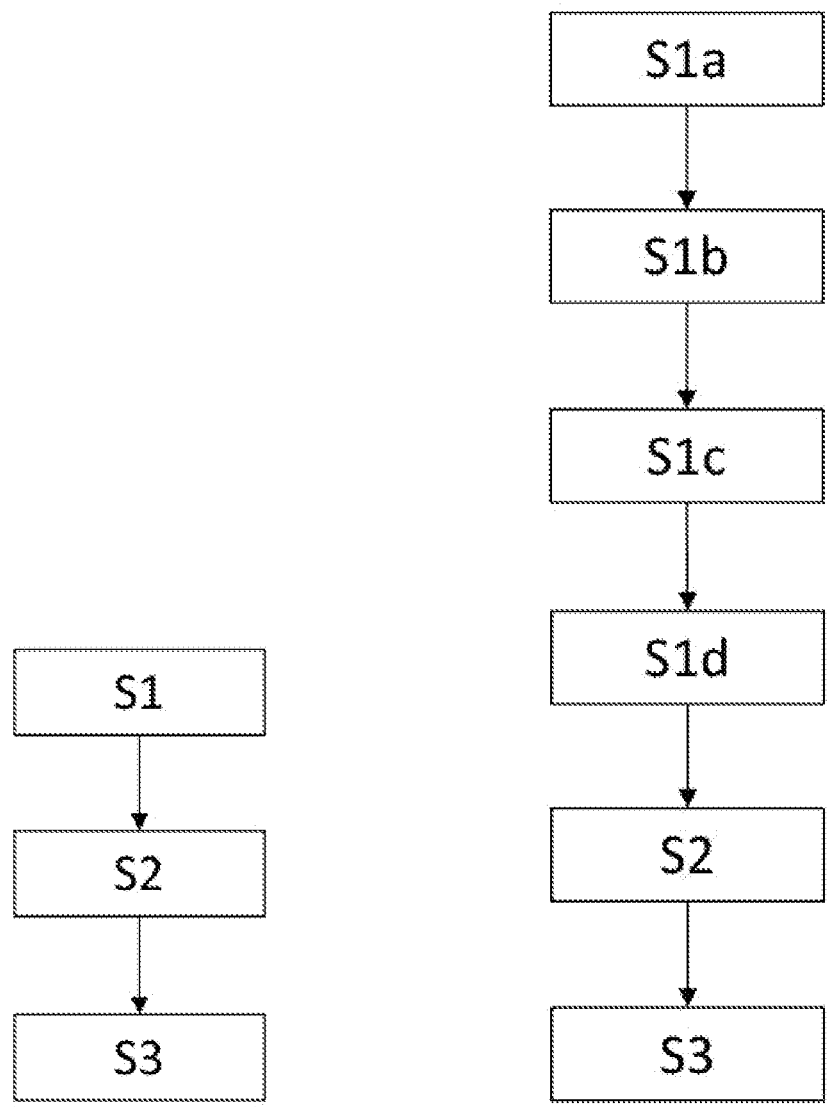

The present invention also relates to a method for manufacturing a torque transmission arrangement as described above with reference to FIG. 1-19B. The method will hereinafter be described with reference to FIG. 20, wherein the method for manufacturing a torque transmission arrangement comprises a first step S1 of providing a cylindrical friction element carrier having a plurality of through-holes distributed around a circumference of the friction element carrier, wherein the cylindrical friction element carrier is configured for carrying at least a pressing plate and a reaction plate of an outer friction-based torque-transmission mechanism rotationally secured to an outer surface of the friction element carrier and at least a pressing plate and a reaction plate of an inner friction-based torque-transmission mechanism rotationally secured to an inner surface of the friction element carrier.

The method further comprises a second step S2 of providing a snap-ring having a plurality of radial projections distributed around the inner or outer circumference of the snap-ring.

Finally, the method comprises a third step S3 of mounting the snap-ring on the friction element carrier, such that said radial projections extend through said through-holes, and such that the snap-ring protrudes in a radial direction beyond both the inner and outer surfaces of the friction element carrier for retaining the inner and outer reaction plates of the inner and outer friction-based torque-transmission mechanisms on the friction element carrier.

In addition to above, the step of providing a cylindrical friction element may be performed in a specific process the enables simplified and cost-efficient manufacturing of the torque transmission arrangement. Specifically, with reference to FIG. 21, said first step S1 of providing a cylindrical friction element carrier having a plurality of through-holes distributed around a circumference of the friction element carrier involves a first sub step S1a of producing a rectangular flat sheet metal work piece, a second sub step S1b of cutting a plurality of through-holes distributed along a line extending adjacent and along an entire side edge of the flat sheet metal work piece, a third sub step S1c of producing linearly extending toothing on both side of the work piece, such that work piece has a meander-like cross section, and a fourth sub step S1d of bending the work piece around an axis that is parallel with the longitudinal extension of the toothing, and mutually fasten the facing side edges, such that a cylindrical friction element carrier is provided. The second and third steps S2, S3 of providing a snap-ring and mounting the snap-ring on the friction element carrier, respectively, are then performed, as described with reference to FIG. 20.

It may be noted that the line with the plurality of through-holes in the work piece, before bending of the work piece in sub step S1d, is perpendicular to the longitudinal extension of the linearly extending toothing.

Although the disclosure has been described in relation to specific combinations of components, it should be readily appreciated that the components may be combined in other configurations as well which is clear for the skilled person when studying the present application. Thus, the above description of the example embodiments of the present disclosure and the accompanying drawings are to be regarded as a non-limiting example of the disclosure and the scope of protection is defined by the appended claims. Any reference sign in the claims should not be construed as limiting the scope.

What is claimed is:

1. A torque transmission arrangement comprising: a cylindrical friction element carrier and a snap-ring, wherein the friction element carrier is configured for carrying at least a pressing plate and a reaction plate of an outer friction-based torque-transmission mechanism rotationally secured to an outer surface of the friction element carrier and at least a pressing plate and a reaction plate of an inner friction-based torque-transmission mechanism rotationally secured to an inner surface of the friction element carrier, wherein the cylindrical friction element carrier comprises a plurality of through-holes distributed around the circumference of the friction element carrier, and wherein the snap-ring comprises a plurality of radial projections distributed around the inner or outer circumference of the snap-ring and configured to extend through said through-holes when the snap-ring is mounted on the friction element carrier, such that the snap-ring when mounted on the friction element carrier protrudes in a radial direction beyond both the inner and outer surfaces of the friction element carrier for retaining the inner and outer reaction plates of the inner and outer friction-based torque-transmission mechanisms on the friction element carrier, wherein the torque transmission arrangement further comprises an outer hub member, an inner hub member, an outer actuating device, and an inner actuating device, wherein the outer friction-based torque-transmission mechanism includes at least one friction disc rotationally secured to the outer hub member and located axially between the pressing plate and reaction plate of the outer friction-based torque-transmission mechanism, wherein the inner friction-based torque-transmission mechanism includes at least one friction disc rotationally secured to the inner hub member and located axially between the pressing plate and reaction plate of the inner friction-based torque-transmission mechanism, wherein each of the inner and outer actuating devices are configured for selectively exerting an axial pressure on the inner and outer pressing plates, respectively, for selectively axially compressing the at least one friction disc against the inner and outer reaction plates for establishing a torque transmission path through the outer and inner friction-based torque-transmission mechanisms.

2. The torque transmission arrangement according to claim 1, wherein the friction element carrier has a hollow cylindrical section with a meander-like cross section, so that outer axially extending toothing is formed on the outer peripheral side of the friction element carrier for engagement with inner toothing of at least the pressing plate and reaction plate of the outer friction-based torque-transmission mechanism, and so that inner axially extending toothing is formed on the inner peripheral side of the friction element carrier for engagement with outer toothing of at least the pressing plate and reaction plate of the inner friction-based torque-transmission mechanism.

3. The torque transmission arrangement according to claim 2, wherein
the snap-ring is mounted on the outer side of the friction element carrier and the through-holes are located primarily in crest-portions of the outer toothing, or
the snap-ring is mounted on the inner side of the friction element carrier and the through-holes are located primarily in crest-portions of the inner toothing.

4. The torque transmission arrangement according to claim 2, wherein the friction element carrier has one through-hole in a crest-portion of each inner or outer tooth.

5. The torque transmission arrangement according to claim 2, wherein the through-holes are formed by a channel extending across the entire width of at least a crest portion of the outer or inner toothing, wherein the channel extends in a direction perpendicular to the axial direction.

6. The torque transmission arrangement according to claim 5, wherein the surfaces forming a bottom of the channel jointly define a cylindrical section that is concentric with the friction element carrier.

7. The torque transmission arrangement according to claim 2, wherein each through-hole extends continuously through and between crest-portions of two, three, four, or more, neighboring inner or outer teeth.

8. The torque transmission arrangement according to claim 1, wherein the friction element carrier in angular sections between neighboring through-holes has full material thickness.

9. The torque transmission arrangement according to claim 8, wherein at least one, specifically two, and more specifically three, fully intact inner or outer teeth are provided between neighboring through-holes.

10. The torque transmission arrangement according to claim 1, wherein the snap-ring has open ends for enabling elastic deformation of the snap-ring upon mounting of the snap-ring on the friction element carrier.

11. The torque transmission arrangement according to claim 1, wherein
the torque transmission arrangement is a clutch-brake arrangement comprising at least one planetary gear set located in a stationary transmission housing, wherein the friction element carrier is stationary and fastened to the housing, wherein the outer hub member is rotationally connected to a sun gear, planetary carrier, or ring gear of one planetary gear set, and wherein inner hub member is rotationally connected to a sun gear, planetary carrier, or ring gear of one planetary gear set, or
the torque transmission arrangement is a dual clutch arrangement, wherein the friction element carrier is rotatably fastened to an input shaft, wherein the outer hub member is rotationally connected to an outer shaft of a concentric dual shaft arrangement, and wherein the inner hub member is rotationally connected to an inner shaft of said concentric dual shaft arrangement.

12. A vehicle comprising a torque transmission arrangement according to claim 1.

13. A method for manufacturing a torque transmission arrangement, the method comprising:

providing a cylindrical friction element carrier having a plurality of through-holes distributed around a circumference of the friction element carrier, wherein the cylindrical friction element carrier is configured for carrying at least a pressing plate and a reaction plate of an outer friction-based torque-transmission mechanism rotationally secured to an outer surface of the friction element carrier and at least a pressing plate and a reaction plate of an inner friction-based torque-transmission mechanism rotationally secured to an inner surface of the friction element carrier, providing a snap-ring having a plurality of radial projections distributed around the inner or outer circumference of the snap-ring, mounting the snap-ring on the friction element carrier, such that said radial projections extend through said through-holes, and such that the snap-ring protrudes in a radial direction beyond both the inner and outer surfaces of the friction element carrier for retaining the inner and outer reaction plates of the inner and outer friction-based torque-transmission mechanisms on the friction element carrier, wherein the torque transmission arrangement further comprises an outer hub member, an inner hub member, an outer actuating device, and an inner actuating device, wherein the outer friction-based torque-transmission mechanism includes at least one friction disc rotationally secured to the outer hub member and located axially between the pressing plate and reaction plate of the outer friction-based torque-transmission mechanism, wherein the inner friction-based torque-transmission mechanism includes at least one friction disc rotationally secured to the inner hub member and located axially between the pressing plate and reaction plate of the inner friction-based torque-transmission mechanism, wherein each of the inner and outer actuating devices are configured for selectively exerting an axial pressure on the inner and outer pressing plates, respectively, for selectively axially compressing the at least one friction disc against the inner and outer reaction plates for establishing a torque transmission path through the outer and inner friction-based torque-transmission mechanisms.

14. The method for manufacturing a torque transmission arrangement according to claim 13, wherein the step of providing a cylindrical friction element carrier involves:
producing a rectangular flat sheet metal work piece,
cutting the plurality of through-holes distributed along a line extending adjacent and along an entire side edge of the flat sheet metal work piece,
producing linearly extending toothing on both side of the work piece, such that work piece has a meander-like cross section,
bending the work piece around an axis that is parallel with the longitudinal extension of the toothing, and mutually fasten the facing side edges, such that a cylindrical friction element carrier is provided.

* * * * *